(12) United States Patent
Taniguchi et al.

(10) Patent No.: US 9,562,489 B2
(45) Date of Patent: Feb. 7, 2017

(54) CONTROL SYSTEM FOR INTERNAL COMBUSTION ENGINE

(75) Inventors: Satoshi Taniguchi, Numazu (JP); Masahiko Masubuchi, Mishima (JP); Koji Kitano, Susono (JP); Hiroshi Eto, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 297 days.

(21) Appl. No.: 14/359,648

(22) PCT Filed: Nov. 22, 2011

(86) PCT No.: PCT/JP2011/076918
§ 371 (c)(1),
(2), (4) Date: May 21, 2014

(87) PCT Pub. No.: WO2013/076811
PCT Pub. Date: May 30, 2013

(65) Prior Publication Data
US 2014/0303876 A1    Oct. 9, 2014

(51) Int. Cl.
*F02D 41/00* (2006.01)
*F02D 41/14* (2006.01)
(Continued)

(52) U.S. Cl.
CPC ............ *F02D 41/30* (2013.01); *F02D 19/024* (2013.01); *F02D 41/0027* (2013.01);
(Continued)

(58) Field of Classification Search
CPC .... F02D 41/30; F02D 19/024; F02D 41/0027; F02D 41/1456; F02D 41/2454; F02D 13/0215; F02D 19/027; F02D 2200/0612; F02M 21/0215; F02M 21/0221; Y02T 10/32
(Continued)

(56) References Cited

U.S. PATENT DOCUMENTS 4,729,359 A   3/1988   Tomisawa et al.
5,752,492 A   5/1998   Kato et al.
(Continued)

FOREIGN PATENT DOCUMENTS

JP   2002-357150 A   12/2002
JP   2004-092529 A   3/2004
(Continued)

*Primary Examiner* — Hai Nuynh
*Assistant Examiner* — Raza Najmuddin
(74) *Attorney, Agent, or Firm* — Andrews Kurth Kenyon LLP

(57) ABSTRACT

An object of the invention is to provide a technology pertaining to a control system for an internal combustion engine using CNG to allow an internal combustion engine to operate appropriately even when properties of CNG change. To achieve the object, in the control system for an internal combustion engine using compressed natural gas according to the invention, when air-fuel ratio feedback control that corrects the fuel injection quantity in such a way as to make the air-fuel ratio of the air-fuel mixture burned in the internal combustion engine substantially equal to a target air-fuel ratio, a control parameter relating to a condition of combustion of the air-fuel mixture is corrected based on the magnitude of the correction value in the air-fuel ratio feedback control.

2 Claims, 7 Drawing Sheets

(51) Int. Cl.
*F02M 21/02* (2006.01)
*F02D 41/30* (2006.01)
*F02D 19/02* (2006.01)
*F02D 41/24* (2006.01)
*F02D 13/02* (2006.01)

(52) U.S. Cl.
CPC ..... *F02D 41/1456* (2013.01); *F02D 41/2454* (2013.01); *F02D 13/0215* (2013.01); *F02D 19/027* (2013.01); *F02D 2200/0612* (2013.01); *F02M 21/0215* (2013.01); *F02M 21/0221* (2013.01); *F02M 26/01* (2016.02); *Y02T 10/32* (2013.01)

(58) Field of Classification Search
USPC ........ 701/101, 102, 103, 104, 109; 123/698, 123/703, 704, 525, 526, 527, 575, 304, 339.12, 123/344, 674, 679
See application file for complete search history.

(56) References Cited

U.S. PATENT DOCUMENTS

| | | | |
|---|---|---|---|
| 5,809,967 A | * | 9/1998 | Masubuchi ............. F02B 43/00 123/406.44 |
| 6,176,227 B1 | * | 1/2001 | Ohuchi ............... F02D 41/0042 123/295 |
| 2007/0033924 A1 | * | 2/2007 | Enoki .................. F01N 11/007 60/276 |
| 2009/0076709 A1 | * | 3/2009 | Shiraishi ............... F02D 31/007 701/103 |
| 2015/0308366 A1 | * | 10/2015 | Melnyk ............... F02D 41/1454 123/299 |

FOREIGN PATENT DOCUMENTS

| | | |
|---|---|---|
| JP | 2004-346911 A | 12/2004 |
| JP | 2005-220860 A | 8/2005 |

\* cited by examiner

CONTROL SYSTEM FOR INTERNAL COMBUSTION ENGINE

CROSS-REFERENCE TO RELATED APPLICATIONS

This is a national phase application based on the PCT International Patent Application No. PCT/JP2011/076918 filed Nov. 22, 2011, the entire contents of which are incorporated herein by reference.

TECHNICAL FIELD

The present invention relates to a control system for an internal combustion engine using compressed natural gas (CNG) as fuel.

BACKGROUND ART

There has been developed previously a technology pertaining to a CNG-fueled internal combustion engine in which an in-cylinder pressure sensor that measures the pressure in a cylinder is provided, properties of fuel are identified based on the measurement value of the in-cylinder pressure sensor, and the fuel injection quantity is corrected based on the properties of fuel thus identified (see Patent Document 1, for example).

PRIOR ART DOCUMENTS

Patent Documents

Patent Document 1: Japanese Patent Application Laid-Open No. 2004-346911

DISCLOSURE OF THE INVENTION

Problem to be Solved by the Invention

Since the pressure in the cylinder can change depending on various factors besides properties of CNG, it is not easy to identify properties of CNG from the measurement value of the in-cylinder pressure sensor precisely. For this reason, there is a possibility that a change in properties of fuel may make appropriate operation of the internal combustion engine difficult.

The present invention has been made in view of the above-described situation, and an object of the present invention is to provide a technology pertaining to a control system for an internal combustion engine using CNG to allow the internal combustion engine to operate appropriately even when properties of CNG change.

Means for Solving the Problem

To solve the above-described problem, in a control system for an internal combustion engine using compressed natural gas according to the present invention, when performing air-fuel ratio feedback control for correcting the fuel injection quantity in such a way as to make the air-fuel ratio of the air-fuel mixture burned in the internal combustion engine substantially equal to a target air-fuel ratio, a control parameter relating to the combustion condition of the air-fuel mixture is corrected based on the magnitude of a correction value in the air-fuel ratio feedback control.

Specifically, according to the present invention, a control system for an internal combustion engine using compressed natural gas, comprises:

control means for performing air-fuel ratio feedback control for correcting the fuel injection quantity based on a difference between the air-fuel ratio of air-fuel mixture burned in the internal combustion engine and a target air-fuel ratio; and correction means for correcting a control parameter relating to a combustion condition of air-fuel mixture when the absolute value of a correction value in said air-fuel ratio feedback control is equal to or larger than a threshold value.

Properties of CNG are not necessarily uniform but may vary from one CNG supply site (filling site) to another. Supplying CNG into a fuel tank (filling) results in mixing of the CNG remaining in the fuel tank (which will be hereinafter referred to as "residual CNG") and the supplied CNG (which will be hereinafter referred to as "filling CNG"). If the filling CNG and the residual CNG have different properties, properties of CNG supplied from the fuel tank to the internal combustion engine after the supply of the filling fuel (i.e. CNG in which filling CNG and residual CNG are mixed, which will be hereinafter referred to as "mixed CNG") are different from properties of the residual CNG.

Effects of a change in properties of CNG on the operation state of the internal combustion engine include a change in the theoretical air-fuel ratio and a change in the Wobbe index (which is the value obtained by dividing the gross heating value of CNG by the square root of the specific gravity of CNG). In particular, a change in the concentration of inert gases (e.g. carbon dioxide ($CO_2$) and nitrogen ($N_2$)) in gas fuel leads to a change in the air-fuel ratio (theoretical air-fuel ratio) at which CNG and oxygen in the air-fuel mixture react without shortfall or residues and a change in the Wobbe index.

The inventors of the present invention conducted experiments and verifications to find that the inert gas concentration in CNG is inversely proportional to the theoretical air-fuel ratio and is also inversely proportional to the Wobbe index. Specifically, we found that the higher the inert gas concentration in CNG is, the lower the theoretical air-fuel ratio is, and the smaller the Wobbe index is. This means that if the control parameter relating to the combustion condition of the air-fuel mixture is set to a value adapted to the theoretical air-fuel ratio of CNG, the value of the control parameter thus set will also be adapted to the Wobbe index of the CNG. Therefore, it is sufficient that the control parameter relating to the combustion condition of the air-fuel mixture be set to a value adapted to one of the theoretical air-fuel ratio or Wobbe index of CNG.

A change in properties of CNG or a change in the inert gas concentration in CNG is reflected in a correction value used in the air-fuel ratio feedback control. Specifically, as the theoretical air-fuel ratio changes with a change in properties of CNG, the oxygen concentration in the exhaust gas changes accordingly. In an internal combustion engine in which the air-fuel ratio feedback control is performed based on the measurement value of an oxygen sensor or an air-fuel ratio sensor, since a change in properties (inert gas concentration) of CNG with the supply of CNG causes a change in the measurement value of the oxygen concentration sensor or the air-fuel ratio sensor, the correction value in the air-fuel ratio feedback control will also change.

For example, in the case where a filling CNG having an inert gas concentration higher than that in the residual CNG is supplied, the inert gas concentration in the mixed CNG becomes higher than the inert gas concentration in the residual CNG. In this case, the theoretical air-fuel ratio of the mixed CNG is lower than the theoretical air-fuel ratio of the residual CNG. Consequently, the air-fuel ratio determined based on the measurement value of the oxygen concentration sensor or the air-fuel ratio sensor will deviate from the target air-fuel ratio to a leaner air-fuel ratio. Therefore, the correction value in the air-fuel ratio feedback control will have a value that leads to an increase in the fuel injection quantity (i.e. a positive value), and the absolute value of it will be larger than the largest absolute value that the correction value can have in the case where properties of CNG are unchanged.

In the case where a filling CNG having an inert gas concentration lower than that in the residual CNG is supplied, the inert gas concentration in the mixed CNG becomes lower than the inert gas concentration in the residual CNG. In this case, the theoretical air-fuel ratio of the mixed CNG is higher than the theoretical air-fuel ratio of the residual CNG. Consequently, the air-fuel ratio determined based on the measurement value of the oxygen concentration sensor or the air-fuel ratio sensor will deviate from the target air-fuel ratio to a richer air-fuel ratio. Therefore, the correction value in the air-fuel ratio feedback control will have a value that leads to a decrease in the fuel injection quantity (i.e. a negative value), and the absolute value of it will be larger than the largest absolute value that the correction value can have in the case where properties of CNG are unchanged.

Therefore, if the absolute value of the correction value in the air-fuel ratio feedback control becomes equal to or larger than a threshold value, it may be concluded that properties of CNG have changed. The threshold value mentioned here is, for example, the largest absolute value that the correction value in the air-fuel ratio feedback control can have on condition that properties of CNG are unchanged plus a margin.

By changing the value of the control parameter relating to the combustion of the air-fuel mixture when it is determined that properties of CNG have changed, a change in the combustion condition of the air-fuel ratio can be prevented from being caused by the change in properties of CNG.

Therefore, the control system for an internal combustion engine according to the present invention allows the internal combustion engine to operate appropriately even if properties of CNG change.

The control parameter varied by the correction means may be the fuel injection quantity. When this is the case, the control means may perform the air-fuel ratio feedback control using a first correction value that is set in relation to the difference between the air-fuel ratio of the air-fuel mixture burned in the internal combustion engine (e.g. the air-fuel ratio determined based on the measurement value of an oxygen sensor or an air-fuel ratio sensor) and the target air-fuel ratio and a second correction value that is set in relation to properties of CNG. In this case, the correction means may correct the fuel injection quantity by changing the second correction value when the absolute value of the first correction value is equal to or larger than the threshold value.

In the case of conventional air-fuel ratio feedback control that does not take into account properties of CNG (e.g. air-fuel ratio feedback control using only the first correction value without using the second correction value), the method of limiting the magnitude of the first correction value to a predetermined range in order to prevent the phenomena (called hunting) that the air-fuel ratio of the air-fuel mixture overshoots and undershoots the target air-fuel ratio. If the magnitude of the first correction value is limited to a predetermined range while the difference between the air-fuel ratio of the air-fuel mixture and the target air-fuel ratio is large due to a change in fuel properties, it is possible that it will take a long time for the air-fuel ratio of the air-fuel mixture to converge to the target air-fuel ratio. To avoid this, the predetermined range may be enlarged. However, if the predetermined range is enlarged when fuel properties have not changed, there is a possibility that the air-fuel ratio feedback control will diverge.

If the air-fuel ratio feedback control using the first and second correction values is performed in the above-described way, it is possible to cause the air-fuel ratio of the air-fuel mixture to quickly converge to the target air-fuel ratio while preventing hunting or divergence, when properties of CNG have changed.

In connection with the above, the correction means may change the second correction value based on a relationship that the theoretical air-fuel ratio is lower and the Wobbe index is smaller when the inert gas concentration in compressed natural gas is high than when it is low.

Specifically, when a filling CNG having an inert gas concentration higher than that of the residual CNG is supplied (i.e. when the inert gas concentration in the mixed CNG is higher than the inert gas concentration in the residual CNG), the correction means may set the second correction value in such a way that the fuel injection quantity is made larger. On the other hand, when a filling CNG having an inert gas concentration lower than that of the residual CNG is supplied (i.e. when the inert gas concentration in the mixed CNG is lower than the inert gas concentration in the residual CNG), the correction means may set the second correction value in such a way that the fuel injection quantity is made smaller. Thus, the fuel injection quantity is adapted to the theoretical air-fuel ratio and the Wobbe index of the mixed CNG consequently.

The aforementioned first correction value includes a correction of the fuel injection quantity made in connection with a change in properties of CNG. Therefore, in the case where the air-fuel ratio feedback control is performed using the aforementioned first correction value and the aforementioned second correction value, a value equal to the amount of change in the second correction value may be subtracted from said first correction value when the second correction value is changed by the correction means. Then, correction based on a change in properties of CNG is prevented from being performed redundantly.

Components in the intake system of the internal combustion engine, components in the fuel injection system, and sensors may have initial tolerances. Moreover, measurement characteristics of sensors (e.g. the air-fuel ratio sensor and the oxygen concentration sensor) and injection characteristics of the fuel injection valve may change with time. Therefore, there may be a constant difference between the actual air-fuel ratio of the air-fuel mixture and the target air-fuel ratio. In view of this, in conventional air-fuel ratio feedback control, learning control is performed to determine the constant difference between the actual air-fuel ratio and the target air-fuel ratio as a learning value, and a correction value in the air-fuel ratio feedback control is set using the learning value.

If after the supply of CNG the aforementioned learning control is performed before the correction means sets a correction value based on a change in properties of CNG, there is a possibility that the correction means cannot set an appropriate correction value. To avoid this, the correction of the fuel injection quantity by the aforementioned correction means may be adapted to be performed prior to the learning control of the correction value in the aforementioned air-fuel ratio feedback control. In other words, in the control system for an internal combustion engine according to the present invention, when the absolute value of the correction value in the air-fuel ratio feedback control is equal to or larger than the threshold value, the correction of the fuel injection quantity by the correction means may be adapted to be performed prior to the aforementioned learning control. With this feature, when properties of CNG have changed, the correction means can set a correction value adapted to the properties after the change.

According to the present invention, a control system for an internal combustion engine using compressed natural gas may comprise:

control means for performing air-fuel ratio feedback control for correcting the fuel injection quantity based on a difference between the air-fuel ratio of air-fuel mixture burned in the internal combustion engine and a target air-fuel ratio;

learning means for performing learning control of a correction value in said air-fuel ratio feedback control when the absolute value of the correction value in said air-fuel ratio feedback control is smaller than a threshold value; and correction means for correcting the fuel injection quantity set by said air-fuel ratio feedback control when the absolute value of a correction value in said air-fuel ratio feedback control is equal to or larger than a threshold value.

In the control system for an internal combustion engine having the above-described features, when the absolute value of the correction value in the air-fuel ratio feedback control is equal to or higher than the threshold value after the supply of CNG, correction of the fuel injection quantity based on a change in properties of CNG can be performed before the leaning control of the correction value in the air-fuel ratio feedback control is performed.

The control parameter used in the present invention is not limited to the fuel injection quantity but it may be ignition timing, opening characteristics of an intake valve, opening characteristics of an exhaust valve, or the degree of opening of an EGR (Exhaust Gas Recirculation) valve.

For example, it is possible that the speed of combustion of the air-fuel mixture is lower when the inert gas concentration in CNG is high than it is low. Therefore, when the supply of CNG has made the inert gas concentration in the mixed CNG higher than the inert gas concentration in the residual CNG, the ignition timing may be advanced. This can prevent the combustion of the air-fuel mixture from ending unduly late. When the supply of CNG has made the inert gas concentration in the mixed CNG higher than the inert gas concentration in the residual CNG, the opening/closing timing of the intake valve and/or the exhaust valve may be changed in such a way as to decrease the quantity of the burned gas remaining in the cylinder (internal EGR gas). This can prevent the combustion speed and the combustion temperature of the air-fuel mixture from decreasing unnecessarily. When the supply of CNG has made the inert gas concentration in the mixed CNG higher than the inert gas concentration in the residual CNG, the EGR valve may be controlled in such a way as to decrease the quantity of EGR gas introduced into the cylinder. This can prevent the combustion speed and the combustion temperature of the air-fuel mixture from decreasing unnecessarily. When the supply of CNG has made the inert gas concentration in the mixed CNG higher than the inert gas concentration in the residual CNG, opening characteristics of the intake valve may be changed in such a way as to increase the flow rate of intake air. This can prevent the combustion speed of the air-fuel mixture from decreasing unnecessarily.

Effects of the Invention

According to the present invention, a control system for an internal combustion engine using CNG allows the internal combustion engine to operate appropriately even when properties of CNG change.

THE BEST MODE FOR CARRYING OUT THE INVENTION

In the following, specific embodiments of the present invention will be described with reference to the drawings. The dimensions, materials, shapes, relative arrangements, and other features of the components that will be described in connection with the embodiments are not intended to limit the technical scope of the present invention only to them, unless particularly stated.

Embodiment 1

Figure 1:
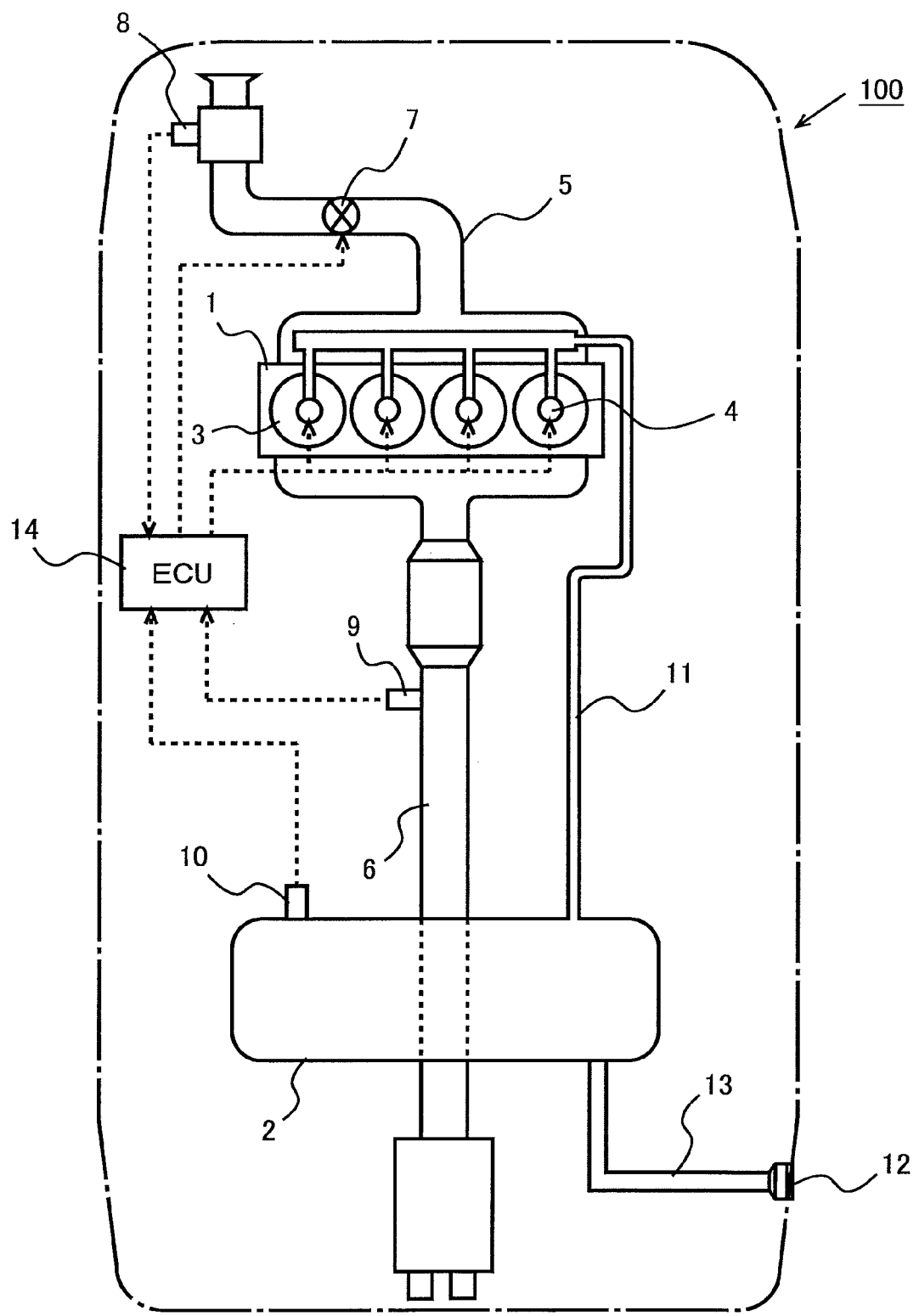
FIG. 1 is a diagram showing the basic construction of an vehicle to which the present invention is applied.

Firstly, a first embodiment of the present invention will be described with reference to FIGS. 1 to 4. FIG. 1 is a diagram showing the basic construction of a vehicle to which the present invention is applied. The vehicle shown in FIG. 1 is a vehicle equipped with an internal combustion engine using CNG.

In FIG. 1, the vehicle 100 is equipped with an internal combustion engine 1 and a fuel tank 2. The internal combustion engine 1 has a plurality of cylinders 3 and fuel injection valves 4 that inject fuel into the respective cylinders 3. An intake passage 5 and an exhaust passage 6 are connected to the internal combustion engine 1.

The intake passage 5 is a passage for introducing fresh air (air) taken from the atmosphere to the cylinders 3 of the internal combustion engine 1. An intake throttle valve 7 for varying the cross sectional area of the intake passage 5 and an intake air temperature sensor 8 that measures the temperature of the fresh air (or the external air temperature) are attached to the intake passage 5.

The exhaust passage 6 is a passage for letting the burned gas (exhaust gas) discharged from the cylinders 3 be emitted to the atmosphere after passing through an exhaust gas purification catalyst and a silencer etc. An A/F sensor 9 that outputs an electrical signal correlating with the air-fuel ratio is attached to the exhaust passage 6.

The fuel tank 2 is a tank for storing compressed natural gas (CNG). A pressure sensor 10 for measuring the pressure in the fuel tank 2 is attached to the fuel tank 2. The fuel tank 2 is in communication with the fuel injection valves 4 of the internal combustion engine 1 through a fuel supply pipe 11. The fuel supply pipe 11 provides a passage for introducing CNG contained in the fuel tank 2 to the fuel injection valves 4. The fuel tank 2 is connected with a filling opening 12 provided on the body of the vehicle 100 via an inlet pipe 13. The filling opening 12 is opened when a filling nozzle used in a gas station or the like is inserted in it to introduce CNG supplied through the filling nozzle into the inlet pipe 13.

The vehicle 100 having the above-described construction is equipped with an ECU 14. The ECU 14 is an electronic control unit composed of a CPU, ROM, RAM, and backup RAM etc. The ECU 14 is electrically connected with various sensors including the intake air temperature sensor 8, the A/F sensor 9, and the pressure sensor 10. The ECU 14 is also electrically connected with various components such as the fuel injection valves 4 and the intake throttle valve 7. The ECU 14 controls the aforementioned components based on signals input from the aforementioned sensors.

For example, the ECU 14 calculates the fuel injection quantity based on the load and speed of the internal combustion engine 1 and controls the fuel injection valves 4 in accordance with the fuel injection quantity thus calculated. Specifically, the ECU 104 calculates the fuel injection quantity (or the time over which the fuel injection valves 4 is opened) etau by the following equation (1):

$$etau = etp * ekaf * k \qquad (1).$$

In the above equation (1), etp is the basic injection quantity derived from a map in which the intake air quantity and the engine speed etc. are used as arguments. The map mentioned here is obtained in advance by an adaptation process based on, for example, an experiment and stored in the ROM of the ECU 14.

The above factor ekaf is a correction factor (or air-fuel ratio feedback correction factor) for nullifying the difference between a target air-fuel ratio and the actual air-fuel ratio (that is, the air-fuel ratio measured by the A/F sensor 9). The factor ekaf is calculated, for example, by the following equation (2):

$$ekaf = (efaf + efgaf + 100)/100 \qquad (2).$$

In the above equation (2), efaf is a correction value (air-fuel ratio feedback correction value), which is determined based on the difference between the target air-fuel ratio and the actual air-fuel ratio. This value efaf constitutes the "correction valve in air-fuel ratio feedback control" in the context of the present invention. Value efgaf is an air-fuel ratio learning value used to compensate a constant difference between the target air-fuel ratio and the actual air-fuel ratio (or a difference caused by aged deterioration in injection characteristics of the fuel injection valves 4 etc.)

Value k in the above equation (1) is an increasing correction factor determined in relation to the cooling water temperature and the accelerator opening degree.

By determining the fuel injection quantity (or fuel injection time) according to the above equations (1) and (2), it is possible to make the air-fuel ratio of the air-fuel mixture burned in the cylinders 3 equal to the target air-fuel ratio. Consequently, it is possible to adjust the output of the internal combustion engine 1 equal to the output requested by the driver and to conform the properties of the exhaust gas to the purifying ability of the exhaust gas purification apparatus.

Properties of CNG supplied to the fuel tank 2 are not necessarily uniform but may vary from one CNG supply site (filling site) to another. Moreover, the air-fuel ratio at which CNG and oxygen in the air-fuel mixture react without shortfall or residues (theoretical air-fuel ratio) varies depending on properties of CNG. In particular, variations in the concentration of inert gases (carbon dioxide ($CO_2$) and nitrogen ($N_2$)) lead to variations in the theoretical air-fuel ratio.

Figure 2:
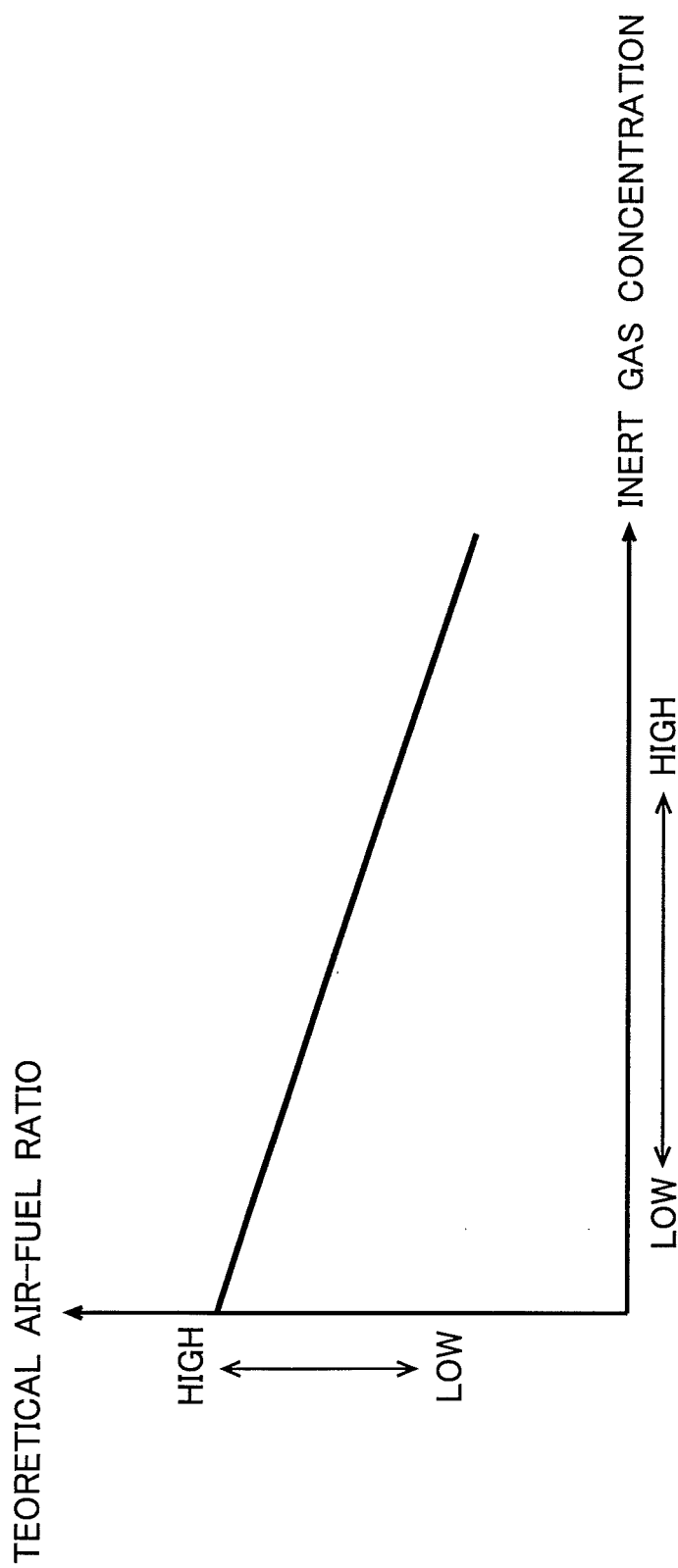
FIG. 2 is a diagram showing a relationship between the concentration of inert gases in CNG and the theoretical air-fuel ratio.

Experiments and verifications conducted by the inventors of the present invention revealed that the concentration of inert gases contained in CNG and the theoretical air-fuel ratio of CNG have a relationship like that shown in FIG. 2. Specifically, the theoretical air-fuel ratio of CNG is lower when the concentration of inert gases in CNG is high than when the concentration is low, as shown in FIG. 2. In consequence, if a CNG (filling CNG) having properties different from a CNG (residual CNG) remaining in the fuel tank 2 is supplied to the fuel tank 2, there is a possibility that controlling the fuel injection quantity and the intake air quantity after the CNG supply in accordance with the theoretical air-fuel ratio of the residual CNG may make the actual air-fuel ratio different from the target air-fuel ratio.

For example, in cases where a filling CNG having an inert gas concentration higher than that of the residual CNG is supplied, the theoretical air-fuel ratio of the CNG after the supply (mixed CNG) becomes lower than the theoretical air-fuel ratio of the residual CNG. Then, if the fuel injection quantity and the intake air quantity are controlled after the supply of the filling CNG in accordance with the theoretical air-fuel ratio of the residual CNG, the actual air-fuel ratio will become higher (or leaner) than the target air-fuel ratio. In consequence, there is a possibility that an increase in exhaust emissions and/or a decrease in the engine power may result.

In cases where a filling CNG having an inert gas concentration lower than that of the residual CNG is supplied, the theoretical air-fuel ratio of the mixed CNG becomes higher than the theoretical air-fuel ratio of the residual CNG. Then, if the fuel injection quantity and the intake air quantity are controlled after the supply of the filling CNG in accordance with the theoretical air-fuel ratio of the residual CNG, the actual air-fuel ratio will become lower (or richer) than the target air-fuel ratio. In consequence, there is a possibility that an increase in exhaust emissions, an increase in the engine power, and/or misfire may result.

Therefore, when a property (inert gas concentration) of the CNG changes, it is necessary to correct a control parameter(s) relating to the air-fuel ratio of the air-fuel mixture (e.g. the fuel injection quantity and/or the intake air quantity) in order to compensate a change in the theoretical air-fuel ratio.

A change in the inert gas concentration in the CNG causes a change in combustion properties of CNG. Therefore, if only a change in the theoretical air-fuel ratio is compensated, it is possible that the quantity of thermal energy generated by the combustion of the air-fuel mixture does not become equal to a desired quantity.

Figure 3:
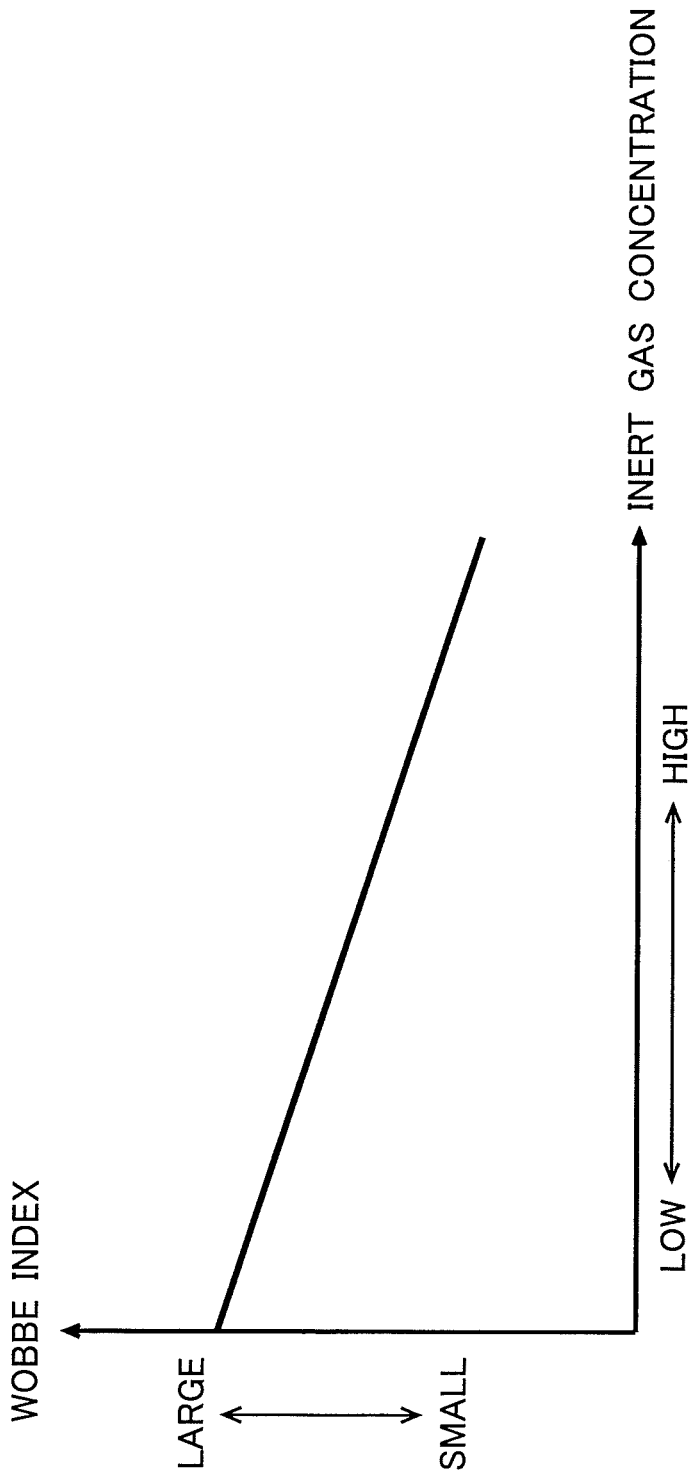
FIG. 3 is a diagram showing a relationship between the concentration of inert gases in CNG and the Wobbe index.

The inventors of the present invention strenuously conducted experiments and verifications to find that the inert gas concentration in CNG and the Wobbe index of CNG have a relationship like that shown in FIG. 3. Specifically, the Wobbe index of CNG is smaller when the inert gas concentration is high than when it is low. This means that if a change in the theoretical air-fuel ratio caused by a change in properties of CNG is compensated, a compensation of a change in the Wobbe index is also achieved. Therefore, if when properties of CNG change a control parameter relating to the air-fuel ratio of the air-fuel mixture is corrected to have a value adapted to the theoretical air-fuel ratio of the CNG, the value of the control parameter after the correction will also be adapted to the Wobbe index of the CNG.

In the following, a case in which when properties of CNG change the fuel injection quantity is corrected as a parameter relating to the air-fuel ratio of the air-fuel mixture will be described.

In this embodiment, the ECU 14 is adapted to calculate the fuel injection quantity (or fuel injection time) etau using the following equation (3) instead of the aforementioned equation (1).

$$etau = etp * ekaf * ekin * k \quad (3)$$

In the above equation (3), what etp, ekaf, and k stand for are the same as those in the aforementioned equation (1). In the above equation (3), ekin is a correction factor (inert gas concentration learning correction factor) for compensating a change in the theoretical air-fuel ratio caused by a change in properties of CNG (i.e. a change in the inert gas concentration).

The inert gas concentration learning correction factor ekin is calculated by the following equation (4):

$$ekin = (eknco2 + 100)/100 \quad (4).$$

In the above equation (4), eknco2 is a learning value (inert gas concentration learning value) used to compensate a constant difference between the target air-fuel ratio and the actual air-fuel ratio being due to the influence of the inert gas concentration in CNG. In the following, a method of determining the inert gas concentration learning value eknco2 in this embodiment will be described.

A change in properties of CNG occurs when CNG is supplied into the fuel tank 2. For example, when a filling CNG having an inert gas concentration higher than that of the residual CNG is supplied, the inert gas concentration of the mixed CNG becomes higher than the inert gas concentration of the residual CNG. When a filling CNG having an inert gas concentration lower than that of the residual CNG is supplied, the inert gas concentration of the mixed CNG becomes lower than the inert gas concentration of the residual CNG.

A change in properties of the mixed CNG caused by the supply of filling CNG will lead to a change in the air-fuel ratio feedback correction value efaf in the air-fuel ratio feedback control started after the supply of the filling CNG.

For example, in the case where a filling CNG having an inert gas concentration higher than that of the residual CNG is supplied, the theoretical air-fuel ratio of the mixed CNG becomes lower than the theoretical air-fuel ratio of the residual CNG. In consequence, the air-fuel ratio measured by the A/F sensor 9 will deviate from the target air-fuel ratio to a leaner air-fuel ratio. The air-fuel ratio feedback correction value efaf in this case will have a value that leads to an increase in the fuel injection quantity (i.e. a positive value), and the absolute value of it will be larger than the largest absolute value that the correction value can have in the case where properties of CNG are unchanged.

In the case where a filling CNG having an inert gas concentration lower than that of the residual CNG is supplied, the theoretical air-fuel ratio of the mixed CNG becomes higher than the theoretical air-fuel ratio of the residual CNG. In consequence, the air-fuel ratio measured by the A/F sensor 9 will deviate from the target air-fuel ratio to a richer air-fuel ratio. The air-fuel ratio feedback correction value efaf in this case will have a value that leads to a decrease in the fuel injection quantity (i.e. a negative value), and the absolute value of it will be larger than the largest absolute value that the correction value can have in the case where properties of CNG are unchanged.

Therefore, if the absolute value of the air-fuel ratio feedback correction value efaf becomes equal to or larger than a threshold value at the time when the air-fuel ratio feedback control is started after the supply of the filling CNG, it may be concluded that properties of CNG have changed. The threshold value mentioned here is, for example, the largest absolute value that the air-fuel ratio feedback correction value efaf can have on condition that properties of CNG are unchanged plus a margin.

If the absolute value of the air-fuel ratio feedback correction value efaf is equal to or larger than the threshold value at the time when the air-fuel ratio feedback control is started after the start of operation of the internal combustion engine 1, the ECU 14 updates the inert gas concentration leaning value eknco2. Specifically, the ECU 14 adds a predetermined value a to the inert gas concentration learning value eknco2. The predetermined value a is set to be a positive value when the air-fuel ratio feedback correction value efaf is positive, and it is set to be a negative value when the air-fuel ratio feedback correction value efaf is negative. The absolute value of the predetermined value a may be a variable value that is set in relation to the absolute value of the air-fuel ratio feedback correction value efaf (alternatively, in relation to the difference between the absolute value of the air-fuel ratio feedback correction value efaf and the aforementioned threshold value). Alternatively, the absolute value of the predetermined value a may be a fixed value determined in advance by adaptation process based on, for example, an experiment.

When the inert gas concentration learning value eknco2 is updated, the ECU 14 subtracts the change in the inert gas concentration learning value eknco2 (i.e. the predetermined value a) from the air-fuel ratio feedback correction value efaf. This is because the correction made with a change in properties of CNG is reflected in both the inert gas concentration leaning value eknco2 and the air-fuel ratio feedback correction value efaf.

The leaning process for the inert gas concentration leaning value eknco2 is to be performed prior to the leaning process for the air-fuel ratio learning value efgaf. This is because if the learning process for the air-fuel ratio learning value efgaf is performed prior to the learning process for the inert gas concentration learning value eknco2 after the supply of the filling CNG, the absolute value of the air-fuel ratio feedback correction value efaf will become smaller than the threshold value even when properties of CNG have changed.

In cases where the difference between the inert gas concentration in the filling CNG and the inert gas concentration in the residual CNG is small, or in cases where the amount of the filling CNG is small relative to the amount of the residual CNG, the difference in properties between the mixed CNG and the residual CNG might be small. The value of the air-fuel ratio learning value efgaf is set on a range-by-range basis for a plurality of operational ranges in terms, for example, of the magnitude of the load. Therefore, a change in properties of CNG might be hard to be reflected in the magnitude of the air-fuel ratio feedback correction value efaf in some operation ranges.

In view of the above, even in the case where the absolute value of the air-fuel ratio feedback correction value efaf does not exceed the threshold value, the ECU 14 may update the inert gas concentration leaning value eknco2 on the assumption that properties of CNG have changed if the absolute value of the average efgafave of the air-fuel ratio leaning values efgaf for all the operation ranges exceeds the threshold value. Specifically, the ECU 14 may add a predetermined value b to the inert gas concentration learning value eknco2 if the absolute value of the aforementioned average efgafave is equal to or larger than the threshold value. The predetermined value b is set to be a positive value when the aforementioned average efgafave is positive, and it is set to be a negative value when the aforementioned average efgafave is negative. The absolute value of the predetermined value b may be a variable value that is determined in relation to the absolute value of the aforementioned average efgafave. Alternatively, the absolute value of the predetermined value b may be a fixed value determined in advance by adaptation process based on, for example, an experiment. In any case, the absolute value of the predetermined value b is set to be smaller than the absolute value of the predetermined value a mentioned before.

The threshold value to be compared with the aforementioned average efgafave is the largest absolute value that the aforementioned average efgafave can have in the case where properties of CNG are unchanged plus a margin. In the following, the threshold value to be compared with the absolute value of the air-fuel ratio feedback correction value efaf will be referred to as the first threshold value, and the threshold value to be compared with the absolute value of the average of the air-fuel ratio learning value efgaf will be referred to as the second threshold value.

On condition that the absolute value of the aforementioned average efgafave is equal to or larger than the second threshold value, when the inert gas concentration learning value eknco2 is updated, the ECU 14 subtracts the change in the inert gas concentration leaning value eknco2 (i.e. the predetermined value b) from the air-fuel ratio leaning value efgaf. In doing so, the ECU 14 subtracts the change in the inert gas concentration leaning value eknco2 from all the air-fuel ratio learning values efgaf, which are set for all the operation ranges respectively.

With the determination (or update) of the inert gas concentration learning value eknco2 according to the above-described method, the fuel injection quantity (fuel injection time) etau calculated by the aforementioned equation (3) will have a value with which a change in the theoretical air-fuel ratio and a change in the Wobbe index resulting from a change in properties of CNG can be compensated. In consequence, when properties of CNG change, the air-fuel ratio of the air-fuel mixture can be converged to the target air-fuel ratio quickly, and the amount of the thermal energy generated by the combustion of the air-fuel mixture can be made equal to a desired amount.

Figure 4:
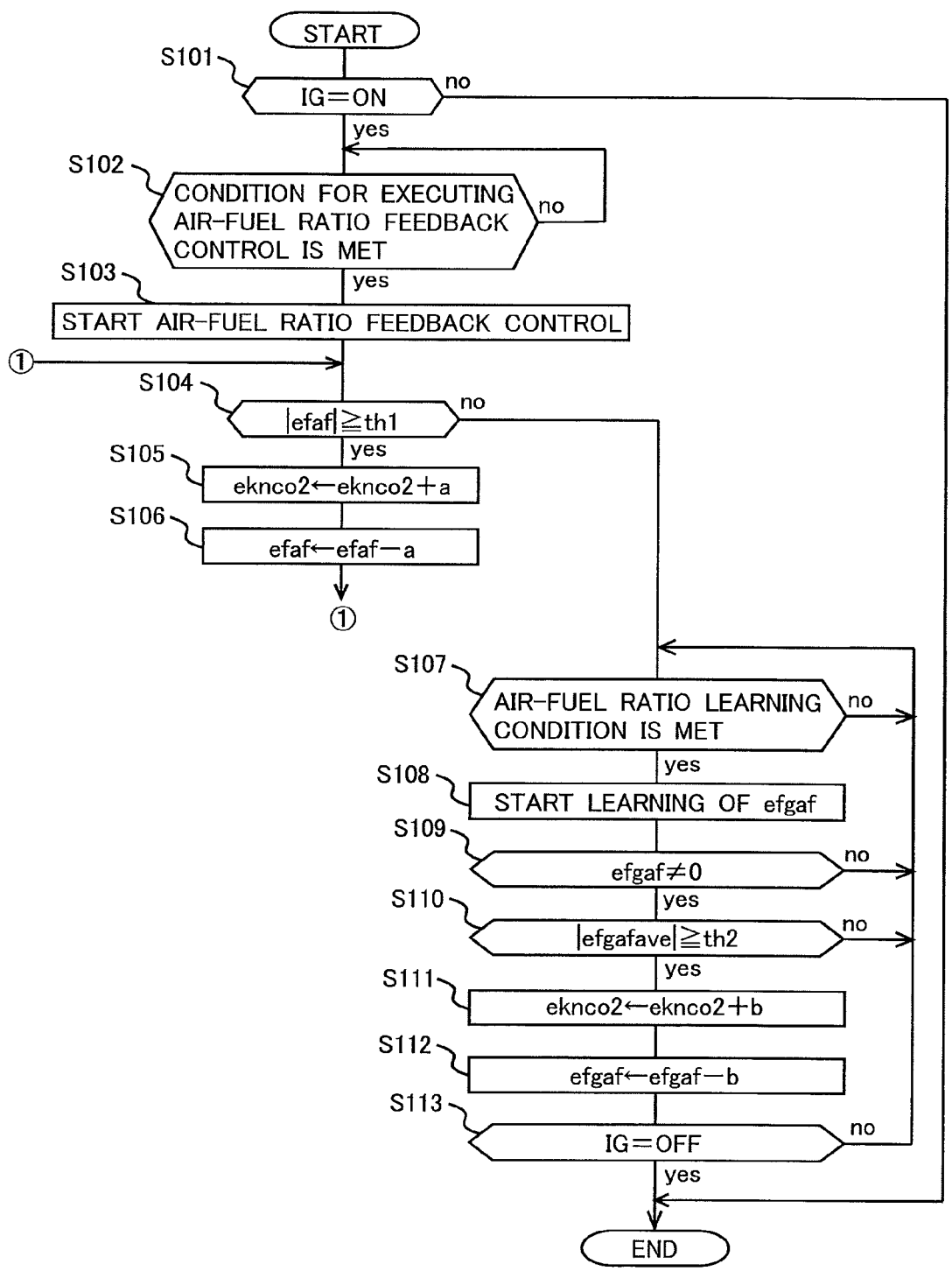
FIG. 4 is a flow chart of a processing routine executed to set the fuel injection quantity (fuel injection time).

In the following, a process of determining the fuel injection quantity (fuel injection time) etau in this embodiment will be described with reference to FIG. 4. FIG. 4 is a flow chart of a fuel injection quantity calculation routine. The fuel injection quantity calculation routine is stored in advance in the ROM of the ECU 14 and executed by the ECU 14 at the start of operation of the internal combustion engine 1 (at the time when the ignition switch is turned on).

In the fuel injection quantity calculation routine, firstly in step S101, the ECU 14 determines whether or not the ignition switch is turned on (IG=ON). If the determination in step S101 is negative (IG=OFF), the ECU 14 once terminates the execution of this routine. If the determination in step S101 is affirmative, (IG=ON), the ECU 14 proceeds to step S102.

In step S 102, the ECU 14 determines whether or not a condition for executing the air-fuel ratio feedback control is met. The condition for executing the air-fuel ratio feedback control is that the A/F sensor 9 is active. The activity of the A/F sensor 9 is determined based on a condition such as that the temperature of the A/F sensor 9 is not lower than an active temperature, that the temperature of cooling water is not lower than a predetermined temperature (that is, the temperature of cooling water that is reached when the temperature of the A/F sensor 9 is not lower than the active temperature), or that the temperature of the exhaust gas in the region downstream of the A/F sensor 9 is not lower than a predetermined temperature (that is, the exhaust gas temperature that is reached when the temperature of the A/F sensor 9 is not lower than the active temperature).

If the determination in step S102 is negative, the ECU 14 executes the processing of step S102 repeatedly. On the other hand, if the determination in step S102 is affirmative, the ECU 14 proceeds to step S103.

In step S103, the ECU 14 starts the execution of the air-fuel ratio feedback control. In dosing so, the ECU 14 executes the air-fuel ratio feedback control according to a subroutine that is separately prepared. In the subroutine mentioned above, the ECU 14 firstly calculates the air-fuel ratio feedback correction value efaf based on the difference between the air fuel ratio measured by the A/F sensor 9 and a target air-fuel ratio. Then, the ECU 14 calculates the air-fuel ratio feedback correction factor ekaf by substituting the air-fuel ratio feedback correction value efaf into the aforementioned equation (2). Moreover, the ECU 14 calculates the fuel injection quantity (fuel injection time) etau by substituting the air-fuel ratio feedback correction factor ekaf into the aforementioned equation (3). The subroutine described above is executed by the ECU 14 repeatedly as long as the condition for executing the air-fuel ratio feedback control is met. The control means according to the present invention is embodied by the execution of the air-fuel ratio feedback control by the ECU 20.

In step S104, the ECU 14 determines whether or not the absolute value (|efaf|) of the air-fuel ratio feedback correction value efaf calculated in the above step S103 is equal to or larger than the first threshold value th1.

The situation in which the absolute value (|efaf|) of the air-fuel ratio feedback correction value efaf is equal to or larger than the first threshold value th1 suggests that properties of CNG in the fuel tank (mixed CNG) have changed by the supply of CNG having properties different from the residual CNG. Therefore, if the determination in step S104 is affirmative (|efaf|≥th1), the ECU 14 proceeds to step S105, where it executes a learning process for the inert gas concentration learning value eknco2. Specifically, the ECU 14 firstly determines a predetermined value a based on the sign (positive/negative) of the aforementioned air-fuel ratio feedback correction value efaf and the absolute value of the air-fuel ratio feedback correction value efaf. Then, the ECU 14 adds the predetermined value a mentioned above to the inert gas concentration leaning value eknco2 and sets the result of this calculation (=eknco2+a) as the updated inert gas concentration learning value eknco2.

After executing the processing of the above step S105, the ECU 14 proceeds to step S106, where it subtracts the aforementioned predetermined value a from the aforementioned air-fuel ratio feedback correction value efaf. After completing the processing of the above step S106, the ECU 14 returns to the aforementioned step S104. Thus, the ECU 14 executes the processing of step S105 and step S106 repeatedly until the absolute value of the air-fuel ratio feedback correction value efaf becomes smaller than the first threshold value th1.

The repetitive execution of the processing of steps S105 and S106 will make the aforementioned air-fuel ratio feedback correction value efaf smaller than the first threshold value th1. Then, the ECU 14 makes a negative determination in step S104 (|efaf|<th1). If a negative determination is made in step S104, the ECU 14 executes a learning process for the air-fuel ratio learning value efgaf in steps S107 to S112.

In step S107, the ECU 14 determines whether or not a condition for leaning the air-fuel ratio learning value efgaf (air-fuel ratio learning condition) is met. The aforementioned air-fuel ratio learning condition is, for example, that the internal combustion engine 1 is in a warmed-up condition (or that the cooling water temperature is not lower than a warm-up criterion temperature) or that the deviation of the magnitude of the air-fuel ratio feedback correction factor ekaf from a predetermined range has continued for a certain period of time. If the determination in the above step S107 is negative, the ECU 14 executes the processing of step S107 repeatedly.

If the determination in step S107 is affirmative, the ECU 14 proceeds to step S108. In step S108, the ECU 14 starts a learning process for the air-fuel ratio learning value efgaf. In dosing so, the ECU 14 executes the learning process for the air-fuel ratio learning value efgaf using a known method.

In step S109, the ECU 14 determines whether or not the air-fuel ratio learning value efgaf obtained in the above step S108 is a value other than zero. If the air-fuel ratio learning value efgaf obtained in the above step S108 is zero (efgaf=0), the ECU 14 returns to the aforementioned step S107. On the other hand, if the air-fuel ratio learning value efgaf obtained in the above step S108 is not equal to zero (efgaf≠0), the ECU 14 proceeds to step S110.

In step S110, the ECU 14 calculates the average efgafave of the air-fuel ratio learning value efgaf for all the operation ranges of the internal combustion engine 1 and determines whether or not the absolute value of the average efgafave is equal to or higher than the second threshold value th2. If the determination in the above step S110 is negative (|efgafave|<th2), the ECU 14 returns to the above-described step S107. On the other hand, if the determination in the above step S110 is affirmative (|efgafave|≥th2), the ECU 14 proceeds to step S111.

In step S111, the ECU 14 executes a learning process for the inert gas concentration learning value eknco2. Specifically, the ECU 14 firstly determines a predetermined value b based on the sign (positive/negative) of the aforementioned average efgafave and the absolute value of the average efgafave. Then, the ECU 14 adds the aforementioned predetermined value b to the inert gas concentration learning value eknco2 and sets the result of this calculation (=eknoco2+b) as the updated inert gas concentration learning value eknco2.

After executing the processing of the above step S111, the ECU 14 proceeds to step S112, where it subtracts the aforementioned predetermined value b from the air-fuel ratio learning value efgaf. In doing so, the ECU 14 subtracts the aforementioned predetermined value b from all the air-fuel ratio learning values efgaf, which are set for all the operation ranges of the internal combustion engine respectively.

After completing the processing in the above step S112, the ECU 14 proceeds to step S113, where it determines whether or not the ignition switch is turned off (IG=OFF). If the determination in step S113 is negative, the ECU 14 executes the processing of the above step S107 and the subsequent steps (or the processing of the above step S104 and the subsequent steps) again. On the other hand, if the determination in step S113 is affirmative, the ECU 14 terminates the execution of this routine.

The correction means according to the present invention is embodied by the execution of the above-described processing of step S105 or S111 by the ECU 14.

As described in the foregoing, with the execution of the processing routine shown in FIG. 4 by the ECU 14, when properties of CNG change (or when the inert gas concentration of CNG changes), the fuel injection quantity (fuel injection time) etau is set to a fuel injection quantity (fuel injection time) adapted to the properties after the change. In other word, the fuel injection quantity (fuel injection time) etau is set to a fuel injection quantity (fuel injection time) that makes the air-fuel ratio of the air-fuel mixture equal to the target air-fuel ratio and makes the amount of thermal energy generated by the combustion of the air-fuel mixture equal to a desired amount. Consequently, a situation in which the air-fuel ratio of the air-fuel mixture deviates from the target air-fuel ratio or a situation in which the amount of thermal energy generated by the combustion of the air-fuel mixture deviates from a desired amount can be prevented from occurring.

Embodiment 2

Figure 5:
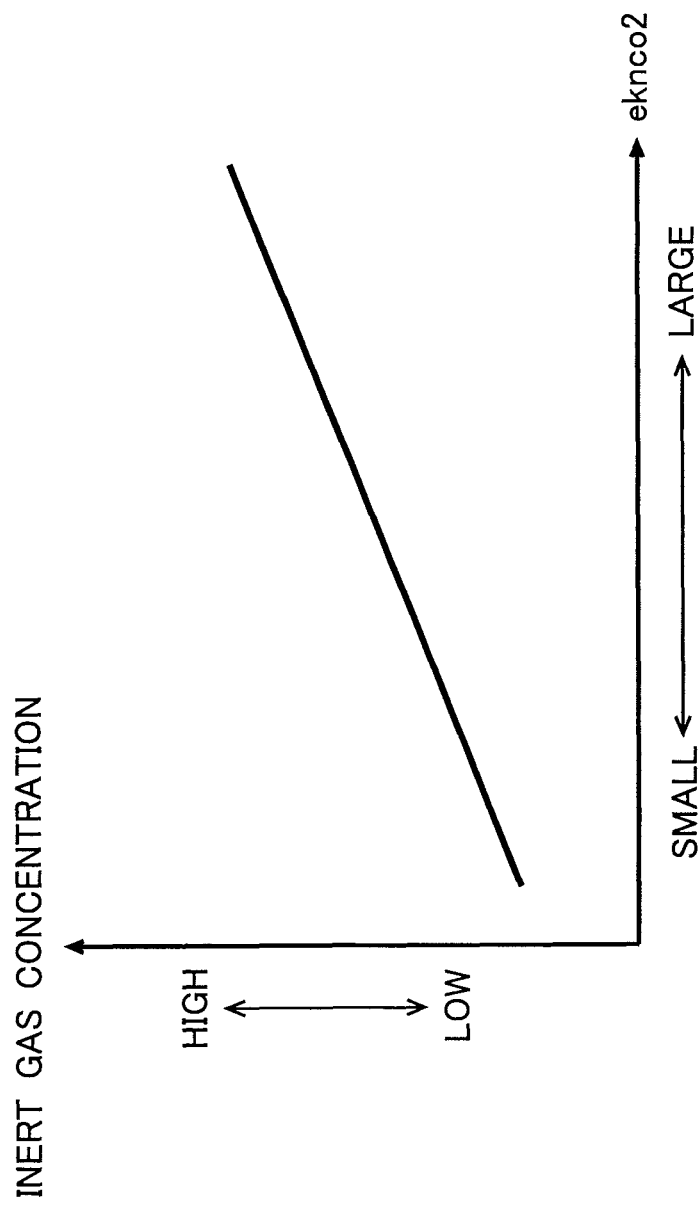
FIG. 5 is a diagram showing a relationship between the concentration of inert gases in CNG and an inert gas concentration learning value eknco2.
Figure 6:
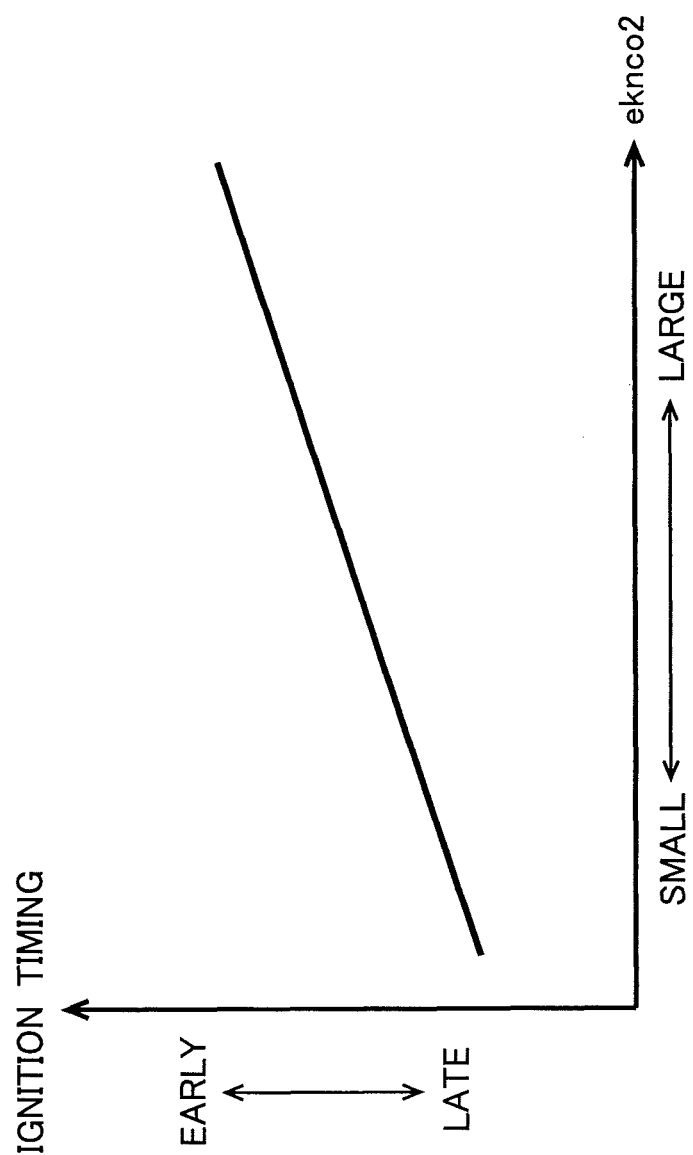
FIG. 6 is a diagram showing a relationship between the inert gas concentration learning value eknco2 and the ignition timing.
Figure 7:
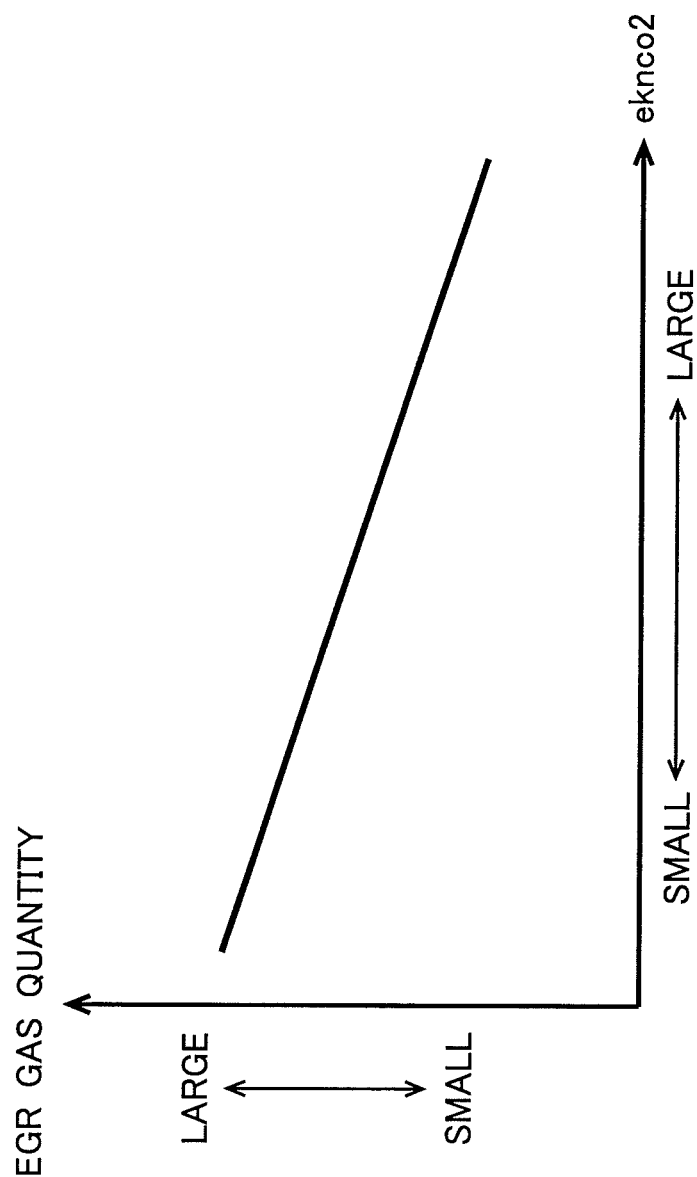
FIG. 7 is a diagram showing a relationship between the inert gas concentration learning value eknco2 and the EGR gas quantity.

Next, a second embodiment of the present invention will be described with reference to FIGS. 5 to 7. In the following, the features that are different from those in the above-described first embodiment will be described, and like features will not be described.

While in the first embodiment described above a case in which the fuel injection quantity (fuel injection time) is corrected when properties of CNG have changes has been described, in this embodiment a case in which the ignition timing is corrected when properties of CNG have changed will be described.

The combustion speed of the air-fuel mixture is lower when the inert gas concentration in CNG is high than when it is low. Low combustion speed of the air-fuel mixture might lead to a decrease in the output of the internal combustion engine 1 or to unnecessarily high exhaust gas temperature.

Therefore, in this embodiment, the ECU 14 is adapted to correct the ignition timing in relation to the inert gas concentration in CNG when properties of CNG have changed. For example, the ECU 14 performs a correction to make the ignition timing earlier (more advanced) when the inert gas concentration in CNG is high than when it is low.

The inert gas concentration in CNG is proportional to the magnitude of the aforementioned inert gas concentration learning value eknco2. Thus, as shown in FIG. 5, the inert gas concentration learning value eknco2 is larger when the inert gas concentration in CNG is high than when it is low. Therefore, the ECU 14 may perform correction in such a way as to make the ignition timing earlier when the inert gas concentration learning value is large than when it is small, as shown in FIG. 6.

By performing the correction of the ignition timing in this way, the time of the end of combustion of the air-fuel mixture can be set to a desired time, even if properties of CNG changes. Consequently, a situation in which the output of the internal combustion engine 1 becomes lower or a situation in which the temperature of the exhaust gas temperature becomes unnecessarily high can be prevented from occurring.

In the case of an internal combustion engine equipped with an EGR system, the ECU 14 may correct the EGR gas quantity instead of correcting the ignition timing. For example, the ECU 14 may correct the degree of opening of the EGR valve in such a way as to make the EGR gas quantity smaller when the inert gas concentration learning value eknco2 is large than when it is small, as shown in FIG. 7. In the case of an internal combustion engine equipped with a variable valve train system that can change the opening/closing timing of the intake and/or exhaust valve, the ECU 14 may control the variable valve train system in such a way as to make the quantity of burned gas remaining in the cylinders 3 (internal EGR gas) smaller when the inert gas concentration learning value eknco2 is large than when it is small. By adjusting the EGR gas quantity in the cylinders 3 in one of the above-described manners, the change in the concentration of the inert gases contained in the air-fuel mixture can be made small even when the inert gas concentration in CNG changes. Consequently, the change in the combustion speed of the air-fuel mixture can be made small when the inert gas concentration in CNG changes.

In the case of an internal combustion engine equipped with a variable valve train system, the ECU 14 may control the variable valve train system in such a way as to change the flow rate of intake air flowing into the cylinders 3 instead of correcting the ignition timing or the EGR gas quantity. For example, the ECU 14 may control the variable valve train system in such a way as to make the flow rate of intake air higher when the inert gas concentration learning value eknco2 is large than when it is small. Higher intake air flow rate can increase the speed of propagation of flame in the combustion of the air-fuel mixture. Consequently, a decrease in the speed of combustion of the air-fuel ratio can be prevented from occurring when the inert gas concentration in CNG becomes high.

While in the above-described first and second embodiments cases in which the present invention is applied to an internal combustion engine in which CNG is injected into cylinders have been described, the present invention may also be applied, as a matter of course, to an internal combustion engine in which CNG is injected into the intake passage (intake port). While in the above-described first and second embodiments cases in which the present invention is applied to an internal combustion engine that uses CNG as fuel have been described, the present invention can also be applied to an internal combustion engine that selectively uses CNG and liquid fuel (such as gasoline or alcohol fuel).

DESCRIPTION OF THE REFERENCE NUMERALS AND SYMBOLS

1: internal combustion engine
2: fuel tank
3: cylinder
4: fuel injection valve
5: intake passage
6: exhaust passage
7: intake throttle valve
8: intake temperature sensor
9: A/F sensor
10: pressure sensor
11: fuel supply pipe
12: filling opening
13: inlet pipe
14: ECU
100: vehicle

The invention claimed is:
1. A control system for an internal combustion engine using compressed natural gas, comprising:
an electronic controller, comprising at least one processor, configured to:
perform air-fuel ratio feedback control for determining a fuel injection quantity by using a first correction value, and a second correction value and controlling an amount of fuel injected from a fuel injector of the internal combustion engine based on the determined fuel injection quantity, the first correction value being a correction term determined in relation to a difference between an air-fuel ratio of an air-fuel mixture burned in the internal combustion engine and a target air-fuel ratio, and the second correction value being a correction term for a difference in an inert gas concentration in compressed natural gas,
correct said second correction value based on said first correction value when the absolute value of said first correction value is equal to or larger than a threshold value, and
perform a learning control of said first correction value after said second correction value is changed.
2. A control system for an internal combustion engine according to claim 1,
wherein said electronic controller is configured to increase said second correction value when said first correction value is positive, and decrease said second correction value when said first correction value is negative.

* * * * *